United States Patent [19]
Goodwin

[11] 3,730,325
[45] May 1, 1973

[54] APPARATUS FOR EJECTING MISALIGNED ARTICLES

[75] Inventor: Robert C. Goodwin, Lancaster, Ohio

[73] Assignee: Anchor Hocking Corporation, Lancaster, Ohio

[22] Filed: Jan. 24, 1972

[21] Appl. No.: 220,032

[52] U.S. Cl. ................... 198/33 R, 209/74, 209/84
[51] Int. Cl. .......................... B65g 47/24, B07c 5/34
[58] Field of Search .................... 198/33 R; 221/167; 209/74, 82, 83, 90

[56] References Cited
UNITED STATES PATENTS

3,053,387  9/1962  Foss et al. .......................... 209/90

*Primary Examiner*—Evon C. Blunk
*Assistant Examiner*—H. S. Lane
*Attorney*—James S. Hight et al.

[57] ABSTRACT

Apparatus for sensing and removing articles which are not within a predetermined zone of alignment on a conveyor. A pair of spaced gates present a doorway between them that defines the alignment zone. Each gate is mounted for swinging movement about two perpendicular axes, and responds to contact of an article with it to trigger a pusher that ejects the out-of-line article from the conveyor.

16 Claims, 6 Drawing Figures

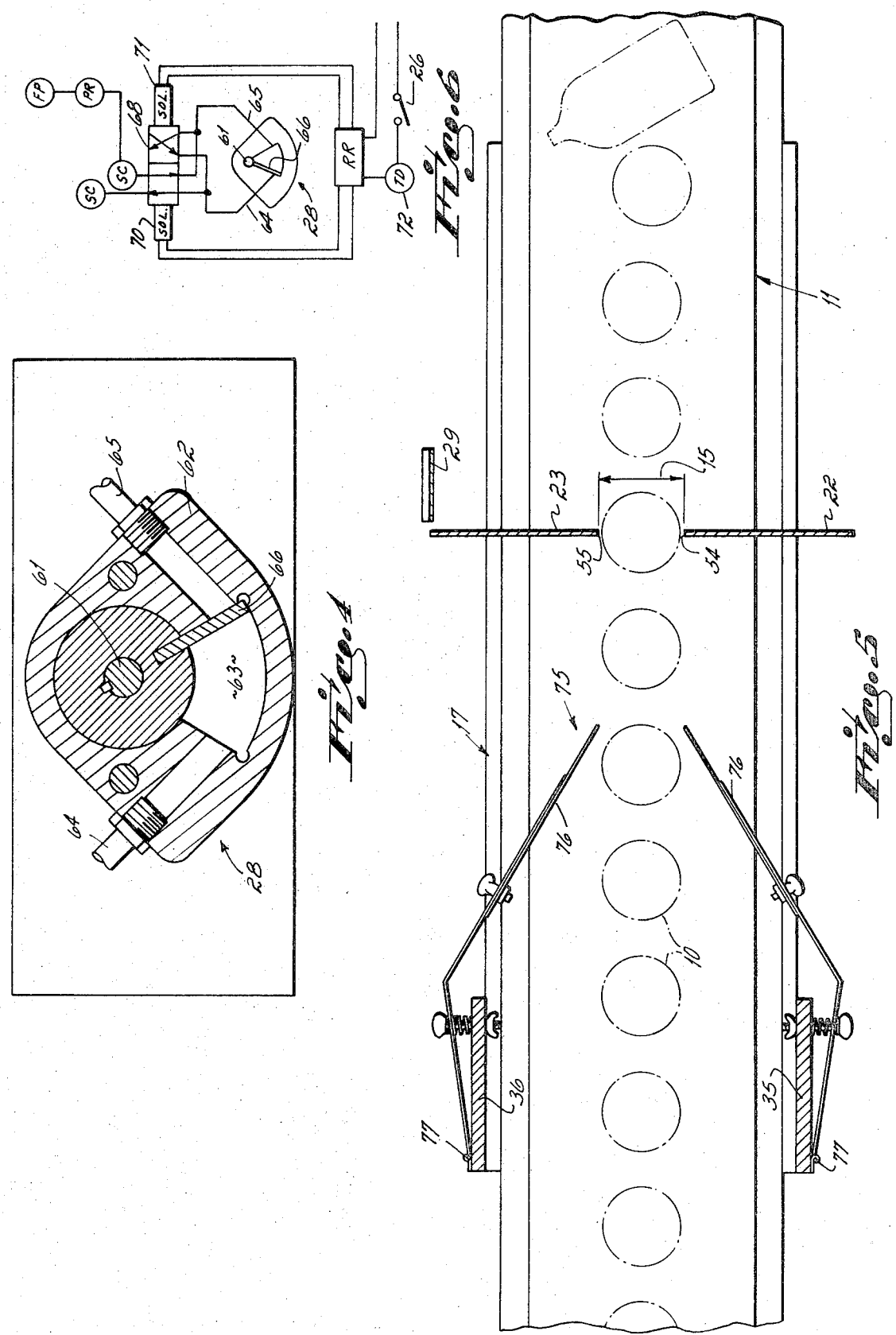

APPARATUS FOR EJECTING MISALIGNED ARTICLES

This invention relates to apparatus for sensing the alignment, with respect to a predetermined path of travel, of an article moving on a conveyor, and for ejecting the article from the conveyor if its path is not within specified lateral limits.

In a broad range of manufacturing processes, it is desirable or necessary that articles which are moving on a conveyor be within a rather accurate degree of lineal alignment. Misaligned articles moving on the conveyor may, for example, tend to jam downstream machinery or cause it to operate improperly.

Many and various devices are known for straightening or realigning out-of-line articles, so that they are thereafter within acceptable alignment. In some instances, however, the moving or realigning of out-of-line articles can be detrimental to the article or its finish, or it may be slow or otherwise undesirable. This is an especially serious problem where the articles being conveyed are newly formed glass carbonated beverage containers, e.g., beer bottles. Since the invention was made in connection with the manufacture of such articles and is especially useful where hot glass articles, travelling a conveyor belt, must be within prescribed limits of alignment on a given path for subsequent processing, it is explained hereinafter primarily in relation to that type of environment.

In the manufacture of glass containers, the molding, pressing or blowing of molten glass into desired shape is carried out at temperatures which typically are well above 1,000°F. During the forming operation, the glassware is cooled sufficiently that it does not thereafter sag out of desired shape, but nonetheless the glass article is far from cool and often retains sufficient heat that it is somewhat plastic or at least "tacky" when it is withdrawn from the forming apparatus. These hot, newly formed pristene articles are placed automatically onto a take-off conveyor, which carries them downstream to further treatment. Typically, the articles are placed in spaced, single line relation on the conveyor. The output of such articles and delivery of them onto the conveyor is typically very rapid, usually upward of 100 or more units per minute. Such rates of take out, combined with the vibration of the still cooling articles as they move on the conveyor, may result in mis-alignment, breakage, or tipping over of some of the articles on the conveyor. If not corrected, these displaced articles can cause jamming or defective operation of downstream machinery.

A common example of the need for alignment arises where the newly formed articles are to receive a so-called "hot end" coating. In that treatment—which is well known to those in the glass container industry—the articles are exposed to an atmosphere of a titanium or a tin compound, which imparts a very thin, useful coating to the glass. In the treatment, the conveyor carries the articles through a narrow tunnel. Misaligned articles often tend to jam or clog the tunnel, and a complete stoppage of flow can occur. Clearing the jam requires opening the tunnel and removal of the articles from its interior, which is a rather time-consuming and possibly hazardous operation. Articles which are off center by more than one-fourth inch (and sometimes less) on one side or the other with respect to a prescribed path of travel, may be undesirably out of line for the hot end coating operation.

In the hot, newly formed pristene condition of the glassware as it travels on the conveyor to the coating tunnel, the articles are extremely susceptible to scratching. Scratching or marring can result from contact with an adjacent container, with metal, or with realignment equipment. Where glass containers for carbonated beverages are being manufactured, such scratches would be considered undesirable.

For this reason, realignment devices—which inevitably require contact between the article and some type of pusher, centering means, or aligning device—involve the very type of article contact that can lead to a potential mark or scratch on a hot pristene glass article. Thus, the alignment techniques which have been used in the past have succeeded in establishing the desired alignment, but at the cost of potential marring of the pristene glass surface.

This invention arises from the determination that, rather than realigning ware which is out of line, and thereby exposing it to the risk of damaging its surface as an incident to the realignment, it is better and safer to detect and eject ware which is not within the prescribed range of alignment so that such ware is entirely removed from production.

Where the articles are glass, the ejected ware can readily be remelted and reformed so that any scratching resulting from misalignment or realignment is altogether obviated.

The problem of removal or ejection of misaligned ware is complicated by two factors. One is the rapid rate of travel of the ware in a modern high speed container line; the time interval between succeeding articles on the conveyor may be of the order of one-half second or less. To be effective, the device must detect and remove the misaligned ware before the next article passes the misalignment detecting device.

Secondly, it is necessary to remove not only ware which is merely offset laterally, but also ware which has fallen down, or which has sagged over, or stuck together. It is also desirable to remove chips or other debris which lie to the side of the predetermined zone of alignment, to prevent such material from passing into and possibly jamming the downstream machinery through which the ware is to pass. For this reason, a feeler or spring finger that, when engaged by out-of-line ware triggers its ejection, does not provide adequare coverage of all of the many positions encountered in practice in which the out of position article may reside. For example, a fallen bottle may simply pass beneath a misalignment detecting finger, and thereby escape ejection. Moreover, a feeler or finger positioned adjacent a line can be damaged if the article being ejected should happen to hit it, either prior to or during ejection. Hence the ejection device must be such that the misalignment detecting means does not impede ejection, and is not damaged by the ejection, yet at the same time it must detect and respond to the many different types of misalignment that can occur, even though they may be infrequent in a day-in, day-out high speed production run.

Broadly speaking, the apparatus of this invention includes yieldable gate structure which presents an open zone that is transverse to and above a conveyor. The door is of a predetermined lateral width such that properly aligned articles on the conveyor can pass through it unobstructed, but articles that project to one side or the other of the desired range will bump into or contact the gate structure on that side of the door. Contact of an article with the gate on either side of this opening causes movement of the gate, which triggers operation of means that ejects the article from the conveyor. Each gate is mounted so that it can swing in either of two mutually perpendicular directions—either parallel to the direction of article travel, or perpendicular to it—to respond to the movement of the article, and to permit it freely to be ejected.

In preferred form, the gates hang from a member that extends transverse to and above the conveyor, and they are swingable about the member. Movement of either gate about the member, i.e., in a direction parallel to the direction of article travel on the conveyor, operates a microswitch which energizes means for ejecting the contacting article. The ejection means preferably is in the form of a pusher arm that extends from a driving shaft that overlies the approximate center line of the conveyor. The pusher arm is swung from one side of the conveyor to the other to eject the article which caused the gate to move.

In addition to being movable about an axis perpendicular to the conveyor direction, each gate is also articulated for movement about a axis parallel to the conveyor direction and can swing outwardly, that is, away from the center line of the conveyor, to permit the article to be ejected.

The gates are returned to a center or rest position in which they are arrested by stops, and in this position their inner edges define the lateral width of the zone of alignment or door previously referred to.

It is a further feature of the invention that means are provided for preventing multiple and possibly ineffective or harmful actuation of the pusher, in response to multiple contacts of a single article with either gate. An article may, in the course of ejection, bump one or the other gate more than once. To prevent multiple activations of the pusher drive in response to such multiple contacts of a single article with the gates, time delay means render the pusher drive unresponsive to further contacts that may occur within a short time interval after an initial contact of an article with either gate. This time interval is desirably adjustable, to accommodate different line speeds, article shapes, and the like, and should reflect the time interval between the arrival of succeeding articles, so that the ejector will not be receptive to further actuation, until another article is approaching the gates.

The invention is further described and explained by reference to the accompanying drawings in which:

FIG. 4 is an enlarged vertical section taken on line 4—4 of FIG. 2;

FIG. 5 is a horizontal section taken on line 5—5 of FIG. 2; and

FIG. 6 is a schematic diagram of an electrical and pneumatic circuit for operating the ejector.

Figure 1:
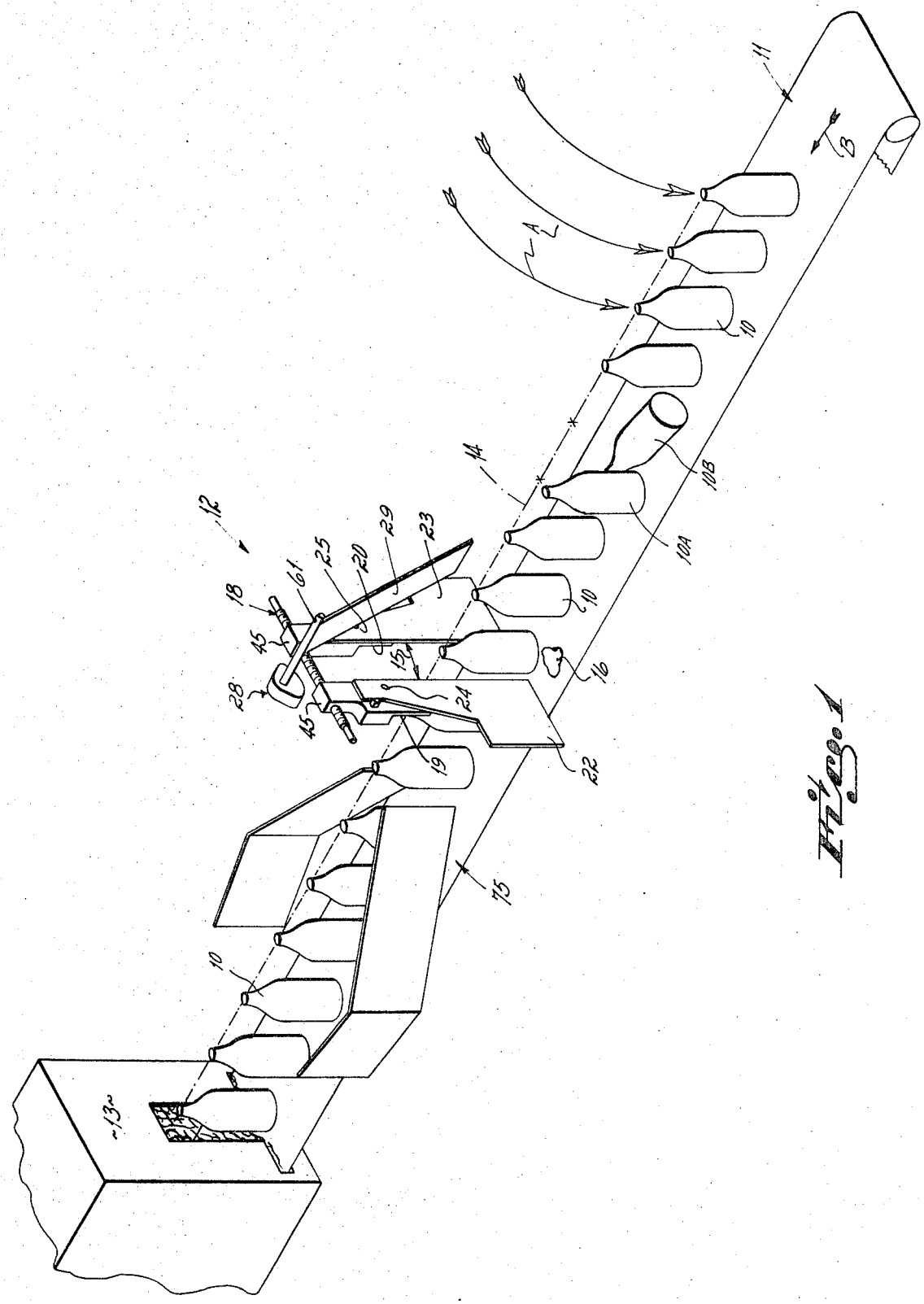
FIG. 1 is a perspective view, somewhat diagrammatic in nature, showing a conveyor which is moving newly formed glass containers to a hot end coating tunnel, and shows diagrammatically a preferred form of ejector mounted upstream of the coating tunnel together with an optional deflector.

For purposes of the following explanation, the device is referred to as being used with a take-off conveyor for hot, newly formed, light weight glass beverage containers. It should be understood that the ejector is not limited to use with such articles, or with any particular type of article, and that the ejector is suitable for use with a wide range of other types of articles, including non-glass articles.

Containers, each designated by 10, are deposited as indicated by the curved arrows A onto a single line conveyor in the form of a belt 11, by conventional glass former mold take-out equipment, not shown. The conveyor, moving in the direction of arrow B, with the containers on it, passes through ejector apparatus indicated generally at 12. Downstream of ejector 12, the conveyor carries the articles 10 into processing apparatus 13 which requires that the articles (within certain limits) be in straight line alignment of the belt. For purposes of explanation, the apparatus 13 is shown as a conventional hot end coating tunnel. That apparatus does not comprise a part of the invention, but it does present the need for container alignment. The ejector 12 insures that the containers enter the apparatus 13 in acceptable alignment.

By way of example, the bottles 10 are assumed to have an approximate diameter of 2 ¾ inches, and their centers are to be aligned within one-eighth of an inch on either side of the center line or plane 14 of the conveyor. Thus, in the embodiment shown, it is desired that the articles reside in a transverse alignment zone having a lateral dimension of 3 inches. The ejector 12 includes two gates 22 and 23 which present a doorway 15 between them having a width corresponding to this dimension. Articles projecting outside of this zone, on either side, are ejected by the apparatus 12.

In FIG. 1, one container 10A is off center to the left of the conveyor center line 14, and lies outside the acceptable alignment zone. Another bottle 10B, fallen on its side, also lies outside the alignment zone. A piece of broken glass 16 on the belt also lies outside the zone.

The apparatus 12 includes support structure generally at 17 (see FIG. 3) by which the ejector is mounted in a position adjacent to the conveyor 11, so that the gates extend generally vertically and transverse to the center line 14 of the conveyor. This support structure 17 mounts a transverse member in the form of a shaft 18 which is rotatable about an axis transverse to the direction B of conveyor travel. A pair of depending arms 19, 20 are adjustably clamped to the shaft 18 at laterally spaced positions. The gates 22, 23 are mounted to arms 19, 20 respectively, by pivotal connections at 24, 25 respectively, and extend downwardly almost to the surface of conveyor 11 (see FIG. 3).

It can be seen that the gates are mounted by articulation structure for swinging movement in a plurality of directions, both in the direction of conveyor travel and perpendicular to it. Specifically, the pivots 24, 25 permit the gates 22, 23 to swing relative to the arms 19 and 20, about axes which are parallel to the direction of conveyor travel designated by the arrow B, that is, laterally outwardly with respect to the conveyor center line 14; the arms 19 and 20 and gates which depend from them are rotatable in the direction of conveyor travel. The effect of this doubly articulated movement will be further described hereinafter.

Figure 3:
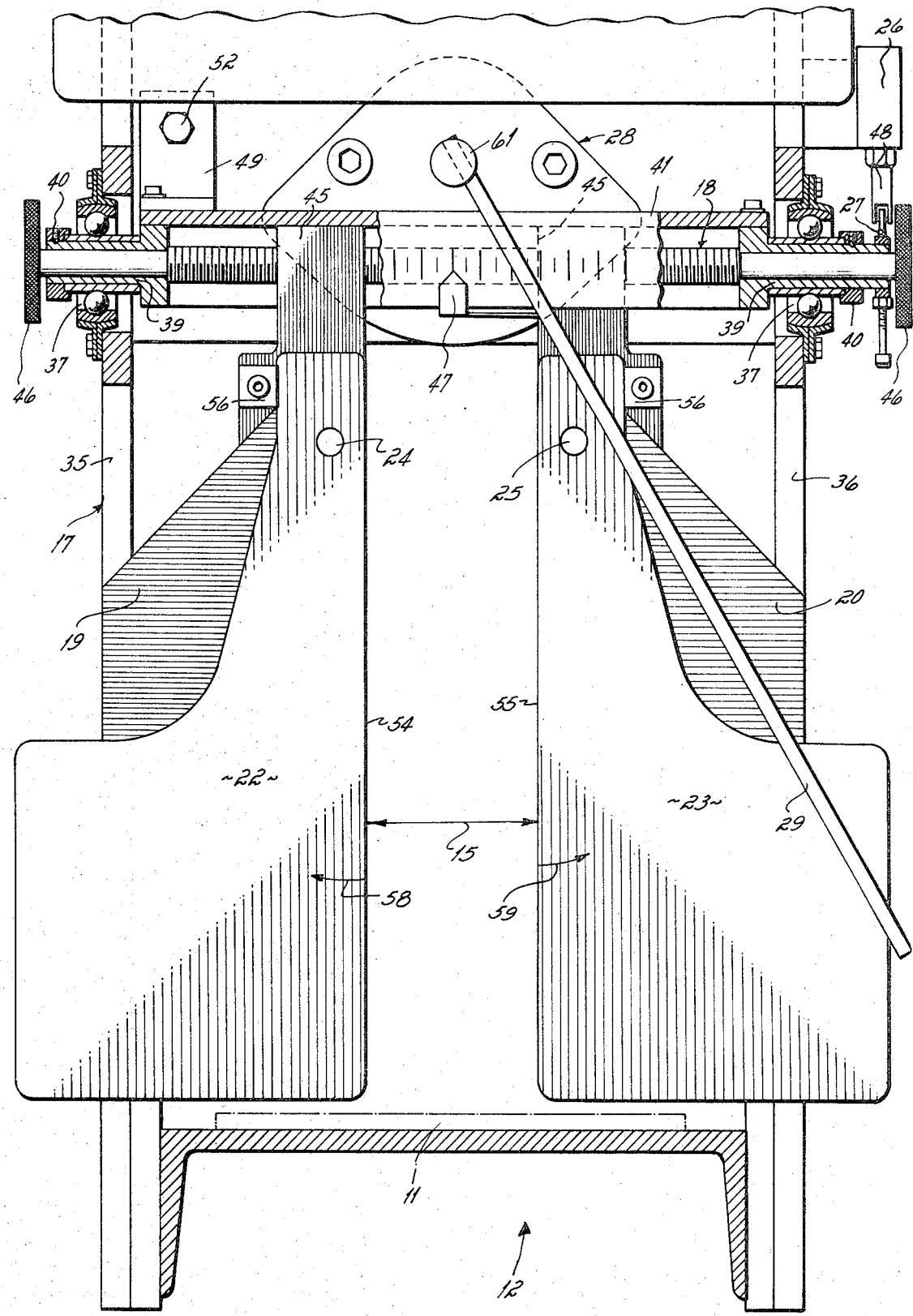
FIG. 3 is a vertical section taken on line 3—3 of FIG. 2.

Switch means in the form of a microswitch 26 and responsive to movement of at least one of the gates in the direction of conveyor travel, is mounted in a position to be operated by a cam or projection 27 mounted to shaft 18, as shown in FIG. 3. Rotation of member 18 about its axis moves the cam 27 with respect to the switch 26, and thereby operates the switch. The switch 26 controls circuitry for applying pressure to operate a motor generally at 28, which in turn moves the flapper or pusher 29 by moving the latter rapidly across the center line 14 of the conveyor just in front of the gates.

In the embodiment shown the pusher arm 29 is mounted for swinging movement. It is rotated about an axis 30 which is parallel to the direction of conveyor movement and which lies above the central line 14. This rotary swinging movement is preferred, for reasons which will be explained, but it should be understood that linear or angulated movements are also within the scope of the invention.

Referring now to the preferred embodiment in greater detail, the support means 17 includes upstanding arms 35, 36 which are mounted to opposite sides of the conveyor carriage. The ends of the shaft 18 are journalled in roller bearings 37, 37 in the arms 35, 36 for rotation relative to the support. Specifically, the cylindrical end portions of shaft 18 are received within sleeves 39, 39 which are seated within the inner races of the bearings 37, 37. Axial shifting movement of the sleeve with respect to the race is blocked by a flange at the inner end of the sleeve and a lock collar 40 around its outer end. The two sleeves 39, 39 are cross connected by a channel member 41.

Between the flanges at the inner end of the sleeves 39, 39 shaft 18 is threaded, see FIG. 3. Desirably, the shaft is threaded in different directions on opposite sides of its midpoint. When the shaft is turned relative to the arms they are moved closer together or farther apart, similar to the manner in which a turnbuckle operates.

The arms 19 and 20 are mounted to threaded blocks 45, 45 which have threaded apertures in them and which are carried on opposite sides of the center of shaft 18. Shaft 18 can be turned by adjusting knobs 46, 46 at its outer ends to move the blocks in opposite directions with respect to the center line 14, and this varies the spacing of the gates and the width of door 15. In ordinary operation the blocks 45, 45 are clamped to shaft 18 and cannot rotate with respect to the shaft. If either arm 19 or 20 is moved by an article impinging on the gate carried by the arm, that rotation is transmitted through the block 45 to the shaft 18.

An indicator needle 47 is fixed to the arm 20 for movement therewith when the knobs 46 are manipulated to adjust the door opening 15. This needle cooperates with a graduated scale fixed to the channel 41 so as to indicate the dimensional width of the door 15.

At the outboard end of shaft 18, cam means 27 in the form of a machine screw is mounted to it and moves in rotation with it. One end of this screw is engaged by a roller at the end of the actuating arm or plunger 48 of microswitch 26. Thus, rotation of either arm 19 or 20 is conveyed to cam means 27, and causes the cam to shift the switch arm 48, thereby operating the switch.

Figure 2:
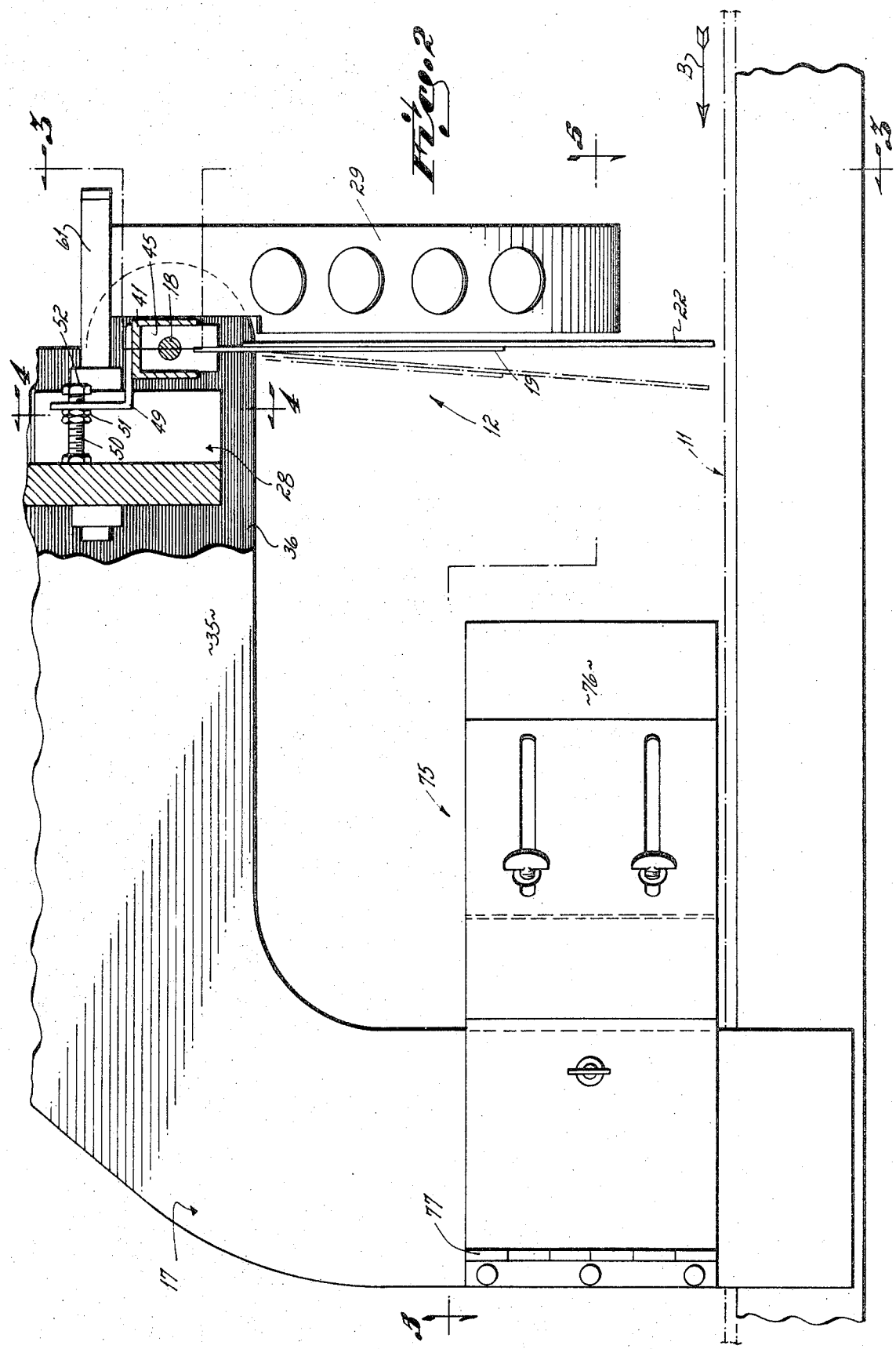
FIG. 2 is a fragmentary vertical section taken along the central plane of the conveyor, and shows the gate articulation and the pusher arm.

As shown in FIG. 2, a flange 49 is secured to channel 41 and has an opening in it through which a motion limiting screw 50 passes. Screw 50 is attached to the support structure 17, and has stops 51, 52 on opposite sides of the leg of flange 49. These stops limit the amount of swing of the gate assembly about the axis of shaft 18. In a given application, the most useful range of motion in this direction will depend upon the type, size and rate of travel of the articles with which the apparatus is being used, but it can readily be determined by simple comparisons. For lightweight beverage containers of the type illustrated in the drawing, it has been found that a range of travel, with respect to screw 50, of about a quarter of an inch works well. This corresponds to the degree of swing of gate 23 which is indicated by the dotted line in FIG. 2. The arms 19 and 20, and gates 22 and 23 on them, rest in essentially vertical position, as shown in the solid line position in FIG. 2.

The inner edges of the gates 22 and 23, that is, the edges thereof which are closest to the center line of the conveyor, are designated at 54, 55 and define the width of doorway 15 between them. These edges will ordinarily be straight, as shown in the drawings, but curved edges could be used if appropriate for the particular type of article. Stops 56, 56 mounted to arms 19 and 20 hold the gates in rest positions so that the gate edges 54 and 55 are substantially perpendicular to the conveyor 11. It will be seen that these stops limit the extent of swinging motion of the gates 22 and 23 toward one another, but do not prevent motion of the gates away from one another, as indicated by arrows 58, 59.

The pusher arm 29, operated by the motor 28, projects radially from a shaft 61 that is driven by motor 28. The motor is supported by the support structure 17, such that shaft 61 preferably extends parallel to the line of conveyor travel, directly above the center line of the conveyor.

Details of the motor are shown in FIG. 4. In the preferred embodiment it comprises a rotary pneumatically actuated cylinder. The motor body 62 presents a segment shaped internal cavity 63. Pressure conduits 64, 65 connect with passages in body 62 that open to the opposite angulated sides of cavity 63. A vane 66 projects radially from shaft 61 in the chamber 63, and its edges form seals with respective walls of the chamber. With reference to FIG. 4 it can be seen that application of pressure through line 65 and release of pressure from line 64, will cause the vane to swing the left across the chamber 63, imparting clockwise motion to shaft 61, whereas reverse application of pressure will cause the vane to swing in the counterclockwise direction. A suitable circuit for operating the apparatus is shown diagrammatically in FIG. 6. Application of pressure to conduit 64 and 65 of the fluid motor 28 is controlled by a double solenoid operated four way valve 68. When solenoid 70 of this valve is energized, the valve 68 directs pressure to conduit 65 and vents line 64, so that the flapper arm swings in one direction across the conveyor. When the opposite solenoid 71 is energized, valve 68 is shifted so that pressure is applied to conduit 64, line 65 is vented, and the pusher arm is swung in the opposite direction. Pressure is supplied from a pump FP, through a pressure regulator PR; speed control valves SC in the inlet and outlet lines control rate of pusher movement.

One useful addition to the invention is the inclusion of a time delay, designated at 72 in FIG. 6, in the circuit of switch means 26. This may be a commercially available device, such as that sold under the trademark "Eagle Cyclefles", model HP517, which provides a time delay adjustment range of 0 to 5 seconds. This delay renders the mechanism unresponsive, once the switch has been actuated, to further gate movements and actuations of the switch, for a brief period of time following the initial switch actuation. A time delay of 0.8 seconds works well in the embodiment described.

The time delay 72 operates a ratchet relay which may be of the type sold by Allied Radio Company under the designation 211XBXP. This actuates the solenoids 70 and 71 alternately in response to switch closures.

The operation of the ejector may now be described. Bottles which are within the zone of alignment do not contact either edge 54 or 55 of gate 22 or 23, and pass freely by the ejector. When a bottle such as the out-of-line bottle 10A contacts either of the gates (in the example shown, the gate 22 would be contacted), its movement in the direction of travel pushes the gate in that direction, and this movement is in turn transmitted to arm 19, block 45, shaft 18, and causes switch closure. This activates the motor 28 which moves the pusher arm from whichever side of the center line it was on, across center to the other side. The swinging movement is quite rapid, and the arm 29 knocks the bottle sideways. A cullet chute, not shown, may be positioned on each side of the conveyor, to receive ejected ware and carry it to a bin for later remelting.

It should be noted that the best shape of the pusher 29 may depend upon the shape of the particular articles with which the ejector is to be used. The pusher desirably is shaped so that it will knock only the single out-of-line bottle from the belt, and it should not contact preceeding or following articles.

It should be noted that the pusher 29 moves across the conveyor from one side to the other in response to the actuation of the switch, but does not return to the original side, until it is actuated by another out-of-line bottle. Since it travels across the conveyor in a single direction only, it can complete the necessary travel at a slower rate of speed than would be needed if it had to reverse direction and return before the next following article passed.

The pusher is preferably positioned in the upstream direction from the gates 22 and 23, that is, in front of them. This is desirable since contact of an article with either gate causes the flapper to be actuated quite rapidly, and the article is usually ejected without even passing into the opening 15. In some instances, however, an article may have passed part way through the doorway before it contacts either gate. In these circumstances, the lateral swingability of the gate enables it to move out of the way, and thereby permit the article to be ejected sideways, without being impeded by the gate.

This articulation movement is also useful for the ejection of fallen bottles such as that shown at 10B, wherein the neck of the bottle may pass through the gate before the side of the bottle actually contacts the gate and causes the ejection movement to commence.

In addition to the ejection of out-of-line articles, an item such as a chunk of glass 16 on the belt will bump the gate, swing the shaft 18, and be ejected. For this reason, it is desirable that the flapper sweep low over the conveyor belt.

In the manufacture of glass articles, it occasionally happens that two newly formed, still hot bottles will come into contact and will stick together. One of these bottles may be in-line, whiLe the bottle to which it is stuck may be out-of-line. In this case, if the in-line bottle is first on the conveyor, it will pass completely through the door and will be out of the path of the pusher 29, by the time the succeeding or following bottle bumps the gate and activates the pusher. Ejection of the latter bottle in such cases can cause the preceeding bottle, to which it was stuck, to move sideways and out of its earlier alignment. For that purpose it is useful to add a downstream deflector of the type indicated at 75, to slide the second bottle off the conveyor. Such occurrences are quite rare, and use of the deflector 75 is useful to remove such bottles, but it is not a necessary part of the invention.

The deflector 75 is shown in FIGS. 2 and 5, and comprises a pair of angulated plates 76, 76 which are hinged about vertical axes 77, 77 on each side of the conveyor. These plates are spring loaded outwardly, and may have extensions which are of adjustable length. These define a gap between them which corresponds substantially to the gap or doorway 15. Ware which has become disaligned after passage through the doorway 15, will be deflected sideways off of these deflectors. Such occurrences are rather unusual, and their sporadic nature does not require the much more positive action of the ejector 12.

Having described my invention, I claim:

1. Ejector apparatus comprising,
   a support adapted to be mounted adjacent to a conveyor,
   said support mounting a gate on each side of the center line of the conveyor, the gates being spaced from one another so that a zone of alignment exists between them through which articles on the conveyor that are within a predetermined lateral zone can pass without contacting either gate, but such that an article which extends out side of said zone of alignment will contact at least one of the gates,
   articulation structure hinging each gate for movement about an axis which is perpendicular to the direction of travel of the conveyor and about a second axis which is parallel to the direction of travel of the conveyor,
   a pusher mounted adjacent to said gates and operable when energized to move an article passing thereby sideways off the conveyor,
   and means responsive to movement of at least one gate about at least one of said axes to energize said pusher.

2. The apparatus of claim 1 wherein the pusher is an arm rotatable through a limited arc of swinging movement, from one side of the conveyor to the other.

3. The apparatus of claim 2 wherein the pusher is driven by a vane fluid motor.

4. The apparatus of claim 1 wherein the gates are suspended from a shaft extending transversely to and above the conveyor, and are adjustably positionable along said shaft to change the width of the zone of alignment.

5. The apparatus of claim 4 wherein said gates are threaded onto said shaft and said shaft is oppositely threaded on opposite sides of its midpoint, so that rotation of said shaft can change the opening of said gates.

6. The apparatus of claim 4 wherein stops limit swinging movement of said gates toward the center line of the conveyor, but the gates are freely swingable outwardly from the center line.

7. Apparatus for ejecting misaligned articles from a conveyor, said apparatus comprising, means mounting a pair of gates in spaced relation, said gates presenting a doorway between them through which only articles within a predetermined zone of alignment can pass without contacting a gate, the mounting means suspending each gate for movement both parallel to and transverse to the direction of conveyor travel, a pusher which is rotatable about an axis that is above the conveyor and generally parallel to the direction of conveyor travel, switch means responsive to movement of either gate in the direction of conveyor travel to energize an operating circuit for rotating the pusher about said axis from one side of the conveyor to the opposite side and thereby shoving a misaligned article off the conveyor.

8. The apparatus of claim 7 wherein the operating circuit reverses the direction of rotation of the pusher about said axis in each succeeding energization by the switch means.

9. The apparatus of claim 7 wherein the extent of gate movement in the direction of conveyor travel is limited to an amount sufficient to cause operation of the switch means.

10. The apparatus of claim 7 wherein the gates are swingable away from the center line of the conveyor an amount sufficient to permit an ejected article to clear between the gate and the conveyor.

11. Ejector apparatus comprising, a support adapted to be mounted adjacent to a conveyor, said support carrying a member extending transversely to the direction of movement of said conveyor, parallel to and above the conveyor, a pair of spaced arms depending from said member and mounted for rotation about the axis of said member, each arm of said pair having a gate mounted to it and depending from it, each gate being pivotally mounted to the respective arm for rotation about an axis parallel to the direction of conveyor travel, said gates being spaced transversely so as to define an opening between them for the passage therethrough of articles being carried on said conveyor, movable means adjacent said opening for ejecting from said conveyor an article which has contacted a gate, means for operating said movable means to cause it to carry out the described movement, and switch means responsive to movement of one of said arms to energize the means for operating the movable means.

12. The apparatus of claim 11 wherein the movable means comprise a pusher mounted for movement across said conveyor adjacent to said opening in a direction for ejecting an article from said conveyor by moving the article laterally off the conveyor.

13. The apparatus of claim 12 wherein said pusher is mounted for swinging movement about an axis parallel to the direction of movement of said conveyor.

14. The apparatus of claim 13 wherein said switch means operates mechanism that swings said pusher in alternate directions across said conveyor in response to successive actuations of the switch means.

15. The apparatus of claim 11 which further includes time delay means that renders said movable means unresponsive to further movement of said arm within a brief predetermined period after an initial energization thereof.

16. The apparatus of claim 11 wherein said arms are mounted on oppositely threaded portions of said member, so that rotation of said member with respect to said arms causes both said arms to move oppositely on said member.

* * * * *